May 23, 1961

J. PINSKY ET AL 2,985,542

COATED PLASTIC ARTICLES

Filed July 26, 1957

INVENTORS
Alvin R. Nielsen
and Jules Pinsky

BY Burns, Doane & Benedict

ATTORNEYS

United States Patent Office 2,985,542
Patented May 23, 1961

2,985,542
COATED PLASTIC ARTICLES
Jules Pinsky, West Hartford, and Alvin R. Nielsen, Hartford, Conn., assignors to Plax Corporation, Bloomfield, Conn., a corporation of Delaware
Filed July 26, 1957, Ser. No. 674,286
9 Claims. (Cl. 117—138.8)

This invention relates generally to synthetic resin containers and more particularly to synthetic resin or plastic containers having an enhanced resistance to permeability by fluids. More specifically, the invention is directed to synthetic resin containers such as polyethylene bottles, a surface of which is modified by application thereto of a coating to prevent or reduce the rate of permeation of the synthetic plastic material by many of the commonly employed fluids, particularly organic liquids.

Synthetic resin containers and bottles as, for example, polyethylene bottles, have become widely popular as a packaging means for various liquids such as deodorants, hair preparations, cosmetic preparations, medicinal preparations, and the like. In particular, polyethylene has been and is widely used in the production of squeeze bottles for the distribution of such preparations in that it is relatively inert, has the necessary flexibility to function as a squeeze bottle, and can be easily fabricated in quantity at a reasonable cost. Unmodified polyethylene is entirely satisfactory for a wide variety of materials. However, polyethylene and other synthetic resins which are usable as containers are permeable to many organic liquids, including a large number of conventional organic solvents which are widely used in fluid preparations for which the polyethylene bottle or container is highly desirable. Representative chemicals, for example, which permeate with various degrees of rapidity through polyethylene at room temperature, include the straight chain hydrocarbons, the aromatic hydrocarbons, esters, ketones, oils and various other non-polar fluids. Consequently, because of this high permeability characteristic of polyethylene and other synthetic resin materials from which containers are desirably fabricated, the use of these materials has of necessity been restricted to those products to which the resin is substantially impermeable. The permeability characteristics of polyethylene with respect to certain of these chemicals has resulted in polyethylene bottles being rejected for use in applications where, due to its flexibility and ease of fabrication, it might otherwise be employed to great advantage.

It has previously been suggested that polyethylene bottles be lined with such materials as polyvinyl alcohol, polyvinyl chloride and copolymers of polyvinyl chloride and polyvinyl acetate to obtain an oil resistant film which will resist permeation by oily materials. While such liners have been moderately successful, there is no liner material currently employed which will form a satisfactorily adherent coating on a polyethylene surface and which will satisfactorily resist permeation by a variety of organic fluids, particularly the various oils employed in lubricating, medicinal and cosmetic applications.

In view of the problems as set forth relating to the use of synthetic resin containers and bottles, particularly those produced from polyethylene, it is a primary object of this invention to provide a synthetic plastic bottle or container characterized by enhanced resistance to permeation by a variety of fluids.

It is another object of this invention to provide a container or bottle formed from a synthetic resin, a surface of which carries a coating which will prevent permeation of the resinous container structure by a variety of commonly employed organic fluids.

It is an additional object of this invention to provide a polyethylene bottle having a resinous coating on the interior and/or exterior surface thereof, said bottle being characterized by a substantial reduction in the rate of permeation by a variety of organic fluids, particularly the commonly employed lubricating oils, medicinal oils, essential oils employed in cosmetic preparations, alcohols and the common hydrocarbon solvents.

It is a more specific object of the invention to provide a polyethylene bottle having an adherent synthetic resin coating which is substantially impermeable to many organic fluids capable of substantially permeating the polyethylene bottle walls in the absence of such a coating.

Generally described, the present invention comprises a synthetic resin container having a surface characterized by enhanced resistance to permeation by organic fluids, said surface having an adherent coating made up of copolymers of vinylidene chloride and acrylonitrile in admixture with an alcoholic-type urea-formaldehyde resin. The composition additionally may contain a terpolymer of vinyl chloride, vinyl acetate and vinyl alcohol. The composition should contain at least 35% by weight of vinylidene chloride acrylonitrile copolymer and at least about 25% by weight of the copolymer of an alcoholic-type urea-formaldehyde resin. The copolymer should contain from about 75% to about 90% by weight of vinylidene chloride monomeric units and from about 25 to about 10% of acrylonitrile monomeric units.

The mixture of the copolymer and the urea-formaldehyde resin may contain a terpolymer made up of vinyl chloride (75% to about 95%) vinyl acetate (2% to about 10%) and vinyl alcohol (3% to about 15%), all percentages expressed herein are by weight unless otherwise indicated. The coating compositions consist essentially of at least 35% by weight of the vinylidene chloride acrylonitrile copolymer and about 25% to about 65% by weight of the said copolymer of an alcoholic-type urea-formaldehyde resin, whether the terpolymer is present or not. The container may carry the adherent coating on its interior and/or exterior surface. In a preferred embodiment, the container will be formed from polyethylene.

Figure 1:
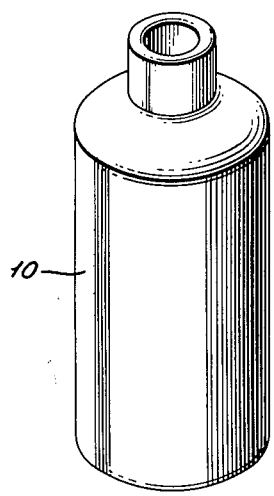
Figure 1 illustrates a type of cylindrical bottle known as the "Boston Round" which may be made of polyethylene and to which the coating composition is applicable.
Figure 2:
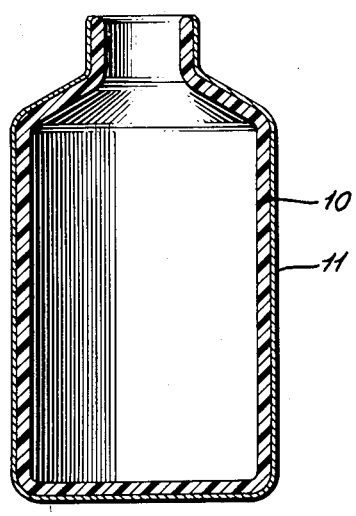
Figure 2 shows a cross-section of the bottle 10 on which a coating of this invention 11 is applied to the outside.
Figure 3:
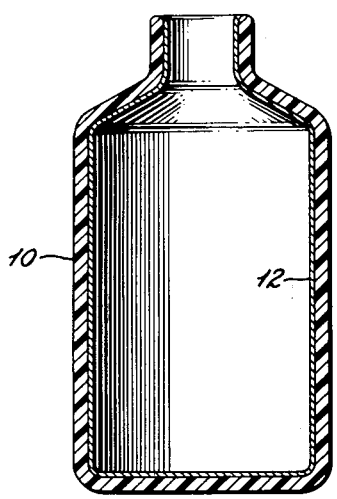
Figure 3 is also a cross-section showing a coating 12 of the bottle 10, the coating comprising the composition of this invention and being applied to the inside of the bottle only.
Figure 4:
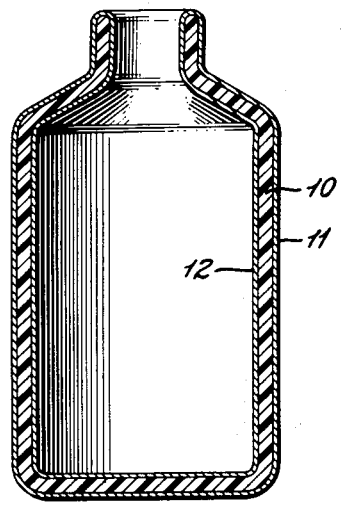

Figure 4 shows the bottle 10 having the coatings 11 and 12 applied to both the inside and outside of the bottle.

In accordance with the invention, the coating agent is dissolved in a suitable solvent, such as methyl ethyl ketone, and the solution is applied to the surface to be coated by conventional coating techniques.

Preferably, the coating will be applied by spraying the interior and/or exterior surface of the container or bottle with the solution. Interior surfaces may be coated manually by at least partially filling the container, followed by suitable manipulative and draining steps, which insure application of an even coating to the interior surface. Exterior surfaces may be coated by simply immersing the article in a bath of the coating solution and allowing the excess solution to drain. Exterior surfaces may also be coated by spraying. The coated surfaces are allowed to dry, either at room temperature or in a heated atmosphere, to remove the solvent. Preferably, the coated articles will be dried at a temperature at about from 160° F. to about 210° F. The softening point of the plastic material being coated generally constitutes the upper limit of the curing temperature and for unmodified polyethylene this upper limit is about 220° F. Where the vinylidene chloride-acrylonitrile polymer is admixed with an intermediate stage alcohol-soluble urea-formaldehyde resin or curable composition containing the requisite amount of said resin, it is preferred to employ a curing temperature of from about 160° F. to about 200° F. for a period of about thirty minutes to about two hours. Shorter periods of time may obviously be employed with higher curing temperatures. The curing time and temperature of mixtures containing the urea-formaldehyde resin will also be varied by the amount and type of catalyst or hardening agent employed. Conventional condensation catalysts acknowledged by the art may be employed, such as sulfuric acid.

Curing may also be effected by irradiation or by a combination of irradiation and heat. Irradiation will not only effect or accelerate the curing of the urea-formaldehyde resin but will also promote graft polymerization between the intermediate stage resin, the polymeric substrate and the copolymeric materials present in the coating composition itself, thus greatly improving the bond between the coating and the substrate.

A plurality of the coatings or linings of the invention may be similarly applied and cured. It will be apparent that a variety of solvents may be employed for applying the copolymeric coating compositions of the invention, the only criteria being that the copolymer be readily soluble in the solvent and that the solvent be removable at temperatures below the decomposition point of either the coatings or the synthetic resinous material from which the container or bottle is made. Methyl ethyl ketone has been found to be an eminently satisfactory solvent. Other operable solvents include, without limitation, toluene, methyl isobutyl ketone, mesityl oxide, cyclohexanone, isophorone, tetrahydrofuran and dimethyl formamids.

Vinylidene chloride-acrylonitrile copolymeric coatings have been found to be exceptionally desirable from the standpoint of flexibility and from the standpoint of use with edible materials and cosmetic preparations. It has been found, for example, that the vinylidene chloride-acrylonitrile coating is especially effective in preventing permeation of essential oils and flavorings, thus preventing materials packaged in containers lined with this coating material from losing taste or fragrance. However, a serious difficulty encountered with this particular liner material has been the deleterious effect exerted by alcohol, and particularly ethyl alcohol, on the bond between the lining and the substrate. Thus, where slight imperfections have occurred in the lining which per se do not materially effect the resistance of the over-all container, alcohols have been found to cause loosening of the lining from the substrate in those areas. This phenomenon is of no serious consequence where the plastic container is pigmented or opaque. However, where the container is transparent or highly translucent, such loosening of the bond between the liner and the substrate is undesirable if only from the standpoint of appearance. Consequently, it has not been feasible to employ the vinylidene chloride-acrylonitrile liner per se in applications involving alcohols where either a strongly adherent coating or liner is essential or desirable, especially in transparent or translucent containers.

It has been found in accordance with the invention, however, that the deleterious effect of alcohols on the bond between the vinylidene chloride-acrylonitrile copolymer and the substrate can be substantially completely obviated by admixture with the copolymer of from about 25 to about 65% by weight of copolymer of an alcohol-soluble ureaformaldehyde resin in an intermediate stage of polymerization or a curable composition containing the requisite amount of the said resin. It has been determined that various polymeric materials can be incorporated into the vinylidene chloride-acrylonitrile copolymer/urea-formaldehyde composition without adversely affecting the permeability characteristics, the alcohol resistance or the flexibility of the final coating composition. In all cases, however, the final composition should contain at least about 35% of the vinylidene chloride-acrylonitrile copolymer. Especially desirable combinations of impermeability and alcohol resistance have been obtained with coating compositions formed by admixing with the vinylidene chloride-acrylonitrile copolymer a composition containing the urea-formaldehyde resin and a terpolymer of from about 75 to about 95% of vinyl chloride, from about 2 to about 10% of vinyl acetate, and from about 3 to about 15% of vinyl alcohol.

The urea-formaldehyde resin employed in the coating composition of the invention is the so-called alcoholic type resin which, in its intermediate stages of cure is soluble in organic solvents. The alcoholic type resin is prepared by reaction of an intermediate urea-formaldehyde condensate with an alcohol, such as butyl, amyl or octyl alcohol, to form an ether type compound. When this ether linkage-containing compound is heated at elevated temperatures or catalyst cured, further condensation occurs with evolution of alcohol. The preferred coating composition of the invention is formulated by admixing Uformite F240 with the vinyl polymer and a suitable solvent. Uformite F240 is a urea-formaldehyde resin produced by Rohm & Haas Company, and is supplied in the form of a solution of 60% of an intermediate condensate dissolved in 40% xylol-butanol (1:1.5).

It is often desirable to pretreat the plastic substrate in order to promote enhanced adherence of the lining or coating material to the substrate, particularly where the surface may be subject to repeated flexing as in squeeze botle applications. In U.S. Reissue Patent 24,062 to Horton, it is disclosed that improved adherence of polar compounds to polyethylene may be effected by treating the surface to be printed, coated or lined with a solution of sulfuric acid and a dichromate. U.S. Patents 2,715,- 075, 2,715,076 and 2,715,077 to Wolinski disclose that desired surface modification may be obtained by treatment with ozone, nitrous oxide or mixtures of the two. Suitable modification may be obtained by flame treating the surface to be printed, coated or lined, as disclosed in U.S. Patents 2,632,921 and 2,704,382 to Kreidl. All of these treatments involve the oxidation of the plastic surface and in many cases the conversion of an initially hydrophobic surface to a hydrophilic surface. However, hydrophobic resinous surfaces may also be rendered more receptive to polar compounds by sulfonation or chlorination.

Thus the degree of adherency of the coatings or liners to the articles or containers of the invention will vary, depending on the nature of the substrate being coated. The coating applied to untreated polyethylene and other normally hydrophobic materials in accordance with the invention is adherent in the sense that the coating clings to the substrate when applied and does not separate during normal usage to a degree deleteriously affecting the resistance to permeation of the coated or lined surface. Where for reasons of optimum performance and/or appearance a more strongly adherent coating or liner is desired, suitable surface pretreatment preferably will be employed.

Having generally described the invention, the following examples are presented for purposes of illustration of various embodiments thereof. All of the surfaces coated were preliminarily treated with a sodium dichromate-sulfuric acid solution or were flame treated prior to the coating operation to render the coating more adherent. The filled bottles subjected to permeability tests were tightly sealed with screw thread caps. The bottles boiled in alcohol in Examples I–III were not capped.

Example I

One hundred parts of vinylidene chloride-acrylonitrile copolymer (80–20) was dissolved in 50/50 methyl ethyl ketone/ethyl acetate and 30 parts of intermediate stage alcohol-soluble urea-formaldehyde resin (UF–240) was added. Polyethylene bottles were lined by the pour-in, pour-out technique and cured at 200° F. for seventy-four hours. Flexible, adherent liners were obtained having an average weight of 0.241 gram. The bottles thus lined are characterized by permeability resistance equivalent to the bottles of the foregoing examples. When these bottles were boiled in methyl alcohol for thirty minutes, only a softening of the liners was noted. No liner separation was apparent.

Example II

Example I was repeated except for addition of 60 parts of urea-formaldehyde resin and a reduction in curing time to four hours. When these bottles were boiled in methyl alcohol for thirty minutes, it was found that there was no liner separation and that the adherent liners could not be stripped from the substrate.

Example III

Sixty grams of an intermediate stage, alcohol-soluble urea-formaldehyde resin and 100 grams of a terpolymer of, by weight, 90% vinyl chloride, 7% vinyl acetate and 3% vinyl alcohol were dissolved in 500 ml. of 50/50 toluene/methyl ethyl ketone. One hundred grams of vinylidene chloride-acrylonitrile copolymer was dissolved in 650 ml. of 50/50 methyl ethyl ketone/ethyl acetate. The two solutions were mixed and employed as a coating mixture for spray lining the interior surfaces of polyethylene bottles. When filled with alcohol and stored for extended periods, no deleterious effect on the lining was noted. When boiled for thirty minutes in alcohol, no liner separation was encountered and following such test the liner could not be stripped from the substrate.

Resins other than the exemplified vinyl chloride-vinyl acetate-vinyl alcohol terpolymers which may be added to the vinylidene chloride-acrylonitrile/urea-formaldehyde resin mixtures include polyvinyl chloride, polyvinyl acetate, copolymers of vinyl chloride and vinyl acetate, polyacrylonitrile, vinyl butyral-vinyl alcohol copolymers, and the like. To be satisfactory, these added materials must not reduce the flexibility of the vinylidene chloride-acrylonitrile copolymer/urea-formaldehyde resin composition to which they are added. As previously indicated, the amount of urea-formaldehyde employed in these mixtures will constitute at least 25% by weight of the vinylidene chloride-acrylonitrile copolymer. Moreover, for satisfactory results, the vinylidene chloride-acrylonitrile copolymer will be employed in amounts constituting at least about 35% by weight of the coating mixture. Where only mixtures of vinylidene chloride-acrylonitrile copolymer and urea-formaldehyde resin are employed, flexibility is undesirably lowered where more than about 65% by weight of the urea-formaldehyde resin is incorporated.

From the foregoing examples, it is apparent that the coated or lined surfaces of this invention exhibit markedly decreased permeation by many commercially employed fluids. Moreover, the coated surfaces of the invention are additionally beneficial in preventing passage of gases, such as oxygen, through the plastic substrate. Consequently, synthetic resin containers, and particularly polyethylene containers and bottles, may, in accordance with the invention, be satisfactorily employed to package such materials or compositions containing these materials.

Although in the examples particular emphasis has been placed on the popular polyethylene bottle and, to a lesser extent, polymethylene and polystyrene containers and articles, it is intended that this invention also broadly include the application of a coating or lining of a coating composition of the present invention to surfaces of other synthetic resinous articles which are permeable to organic fluids. The invention is broadly applicable to plastic articles or containers fabricated from all types of thermoplastic or thermo-setting resins. More specifically, the invention is applicable to articles or containers fabricated from such materials as polyethylene, including conventional polyethylene and the so-called new type low temperature polyethylene, such as Ziegler polyethylene, polymethylene or polyethylene substantially free of branched chains; polyethylene terephthalate, polytetrafluoroethylene; nylon, acetate copolymers, ethylene-polyvinyl acetate copolymers, epoxy resins, coumarone resins; indene resins; acetylene polymers, including their halogenated derivatives; polymers of olefin hydrocarbons other than ethylene, including polymers of isoprene, butadiene and their homologues, and halogen-substituted derivatives thereof; olefin-sulfur dioxide resins; phenol-aldehyde resins; aldehyde resins; furfural resins; ketone resins; urea-formaldehyde type resins, including thiourea formaldehyde, melamine formaldehyde, and dicyandiamide-formaldehyde resins; amine-aldehyde resins; sulfonamide-aldehyde resins; nitro resins; resins from such nitrogen-containing materials as hydrazine and related substances, pyrazoles, pyridine, quinoline, pyrrole, indole, and carbazole; condensation polyester resins, including resins obtained from polyhydric alcohols and polybasic acids, and from hydroxy acids; polyamide resins and derivatives thereof; mixed polyester-polyamide resins; polyether resins; polyvinyl ethers; polyvinyl alcohols; polyvinyl esters; rubber and its derivatives; cellulose esters and cellulose ethers. All of these plastic materials may be used with any of the usual modifying agents including plasticizers, pigments, fillers, dyes and materials which combine chemically with the polymer ingredients either during formation of the polymer or during an after treatment. Thus, surfaces and containers fabricated from copolymers, interpolymers and mixtures of polymers may be advantageously rendered less permeable to organic fluids by application of a coating or lining of a coating composition of this invention.

As indicated, containers or bottles may, in accordance with the invention, be coated or lined on either the interior or exterior surfaces. Where the problem involved is merely the prevention of moisture from entering the product to be packaged or to prevent gases from the atmosphere from contacting the contents of the container, an external coating is satisfactory. However, from the standpoint of the permeation of a liquid within a container outwardly through the container walls, it is greatly preferred to employ an interior lining or coating. As shown in the examples, the permeation of the liquid into the container wall causes considerable swelling or distortion of the container and, in some cases, actually causes collapse of the physical structure. Moreover, with an external coating, an ingredient of the fluid content may be essential, although quantitatively small, and, consequently, such ingredient may be lost by absorption in the container wall even though the ingredient does not escape from the bottle itself. This latter situation is especially important where the containers are employed for skin lotions, perfumes, and the like, in which the essential oil fraction governing the perfume odor is relatively small. Accordingly, despite the proportionally greater difficulty of applying a lining to the container's interior, the advantages of such an inner lining are such that it is preferred. In some instances it may be desirable to apply both an interior and exterior lining.

The mechanical method of applying the coatings or linings to the container surfaces are well known to the art and do not constitute a part of the present invention, Specific details of the operation and functioning of spray coating units may be found in Paasche Patents 2,547,884, 2,059,706 and 2,069,844.

Since modification of the disclosed invention will be apparent to those skilled in the art, it is intended that the invention be limited only by the scope of the appended claims.

This application is a continuation-in-part of application Serial No. 573,559, filed March 23, 1956, now Patent No. 2,860,801, and a continuation in part of application Serial No. 573,560, also filed March 23, 1956, now abandoned.

What is claimed is:

1. A sealable synthetic resin container having a surface characterized by enhanced resistance to permeation by organic fluids, said surface having an adherent coating consisting essentially of a mixture of at least about 35% by weight of a copolymer of from about 75 to about 90% of vinylidene chloride and from about 25 to about 10% of acrylonitrile with a composition consisting essentially of a terpolymer of vinyl chloride, vinyl acetate and vinyl alcohol and at least about 25% by weight of the said copolymer of an alcoholic-type urea-formaldehyde resin.

2. A sealable synthetic resin container having a surface characterized by enhanced resistance to permeation by organic fluids, said surface having an adherent coating consisting essentially of a mixture of at least 35% by weight of a copolymer of from about 75 to about 90% of vinylidene chloride and from about 25 to about 10% of acrylonitrile with a composition consisting essentially of a terpolymer of about 75 to about 95% by weight of vinyl chloride, about 2 to about 10% by weight of vinyl acetate and about 3 to about 15% by weight of vinyl alcohol and at least about 25% by weight of the said copolymer of an alcoholic-type urea-formaldehyde resin.

3. A sealable synthetic resin container having a surface characterized by enhanced resistance to permeation by organic fluids, said surface having an adherent coating consisting essentially of a mixture of a copolymer of from about 75 to about 90% of vinylidene chloride and from about 25 to about 10% of acrylonitrile and from about 25 to about 65% by weight of the said copolymer of an alcoholic-type urea-formaldehyde resin.

4. A sealable polyethylene container having a surface characterized by enhanced resistance to permeation by organic fluids, said surface having an adherent coating consisting essentially of a mixture of at least about 35% by weight of a copolymer of from about 75 to about 90% of vinylidene chloride and from about 25 to about 10% of acrylonitrile with a composition consisting essentially of a terpolymer of vinyl chloride, vinyl acetate and vinyl alcohol and at least about 25% by weight of the said copolymer of an alcoholic-type urea-formaldehyde resin.

5. A sealable polyethylene container having a surface characterized by enhanced resistance to permeation by organic fluids, said surface having an adherent coating consisting essentially of a mixture of at least about 35% by weight of a copolymer from about 75 to about 90% of vinylidene chloride and from about 25 to about 10% of acrylonitrile with a composition consisting essentially of a terpolymer of about 75 to about 95% by weight of vinyl chloride, about 2 to about 10% by weight vinyl acetate and about 3 to about 15% by weight of vinyl alcohol and at least about 25% by weight of the said copolymer of an alcoholic-type urea-formaldehyde resin.

6. A sealable polyethylene container having a surface characterized by enhanced resistance to permeation by organic fluids, said surface having an adherent coating consisting essentially of a mixture of a copolymer of from about 75 to about 90% of vinylidene chloride and from about 25 to about 10% of acrylonitrile and from about 25 to about 65% by weight of the said copolymer of an alcoholic-type urea-formaldehyde resin.

7. A polyethylene container of enhanced resistance to permeation by fluids comprising an initially oxidized surface having a strongly adherent coating consisting essentially of at least about 35% by weight of a mixture of a copolymer of from about 75 to about 90% of vinylidene chloride and from about 25 to about 10% of acrylonitrile with a composition consisting essentially of a terpolymer of vinyl chloride, vinyl acetate and vinyl alcohol and at least about 25% by weight of the said copolymer of an alcoholic-type urea-formaldehyde resin.

8. A polyethylene container of enhanced resistance to permeation by fluids comprising an initially oxidized surface having a strongly adherent coating consisting essentially of a mixture of at least about 35% by weight of a copolymer of from about 75 to about 90% of vinylidene chloride and from about 25 to about 10% of acrylonitrile with a composition consisting essentially of a terpolymer of about 75 to about 95% by weight of vinyl chloride, about 2 to about 10% by weight vinyl acetate and about 3 to about 15% by weight of vinyl alcohol and at least about 25% by weight of the said copolymer of an alcoholic-type urea-formaldehyde resin.

9. A polyethylene container of enhanced resistance to permeation by fluids comprising an initially oxidized surface having a strongly adherent coating consisting essentially of a mixture of a copolymer of from about 75 to about 90% of vinylidene chloride and from about 25 to about 10% of acrylonitrile and from about 25 to about 65% by weight of the said copolymer of an alcoholic-type urea-formaldehyde resin.

References Cited in the file of this patent

UNITED STATES PATENTS

| | | |
|---|---|---|
| 2,384,880 | Britton et al. | Sept. 18, 1945 |
| 2,748,027 | Meier | May 29, 1956 |
| 2,786,783 | Hahn et al. | Mar. 26, 1957 |
| 2,805,960 | Wolinski | Sept. 10, 1957 |
| 2,860,801 | Nielson | Nov. 18, 1958 |

OTHER REFERENCES

Saran Resin F–120; Dow Chemical Co., November 1954 (23 pages).